United States Patent [19]

Martin et al.

[11] Patent Number: 4,555,378
[45] Date of Patent: Nov. 26, 1985

[54] METHOD OF FORMING THERMOPLASTIC PERFORATED SHEET

[75] Inventors: Richard A. Martin, Tarrytown, N.Y.; Walter Bialobrzeski, Wallingford, Conn.

[73] Assignee: Dick Martin Design Ltd., Tarrytown, N.Y.

[21] Appl. No.: 600,139

[22] Filed: Apr. 13, 1984

[51] Int. Cl.$^4$ .......................... B29C 17/02; B29C 1/02
[52] U.S. Cl. .................................... 264/292; 264/219;
 264/313; 264/324; 425/398; 425/399; 425/400
[58] Field of Search ............... 264/546, 292, 313, 324,
 264/219; 425/398, 399, 400

[56] References Cited

U.S. PATENT DOCUMENTS

| | | | |
|---|---|---|---|
| 2,190,807 | 2/1940 | Steinberger | 264/324 X |
| 2,867,889 | 1/1959 | Thompson, Jr. | 264/292 X |
| 2,942,297 | 6/1960 | Michalko | 425/399 |
| 3,584,109 | 6/1971 | Meadors et al. | 425/398 X |
| 4,008,029 | 2/1977 | Shokite | 425/398 X |
| 4,127,374 | 11/1978 | Ammeraal | 425/400 X |

FOREIGN PATENT DOCUMENTS 1251528 12/1960 France ................................ 425/398

Primary Examiner—Jan Silbaugh
Attorney, Agent, or Firm—Yuter, Rosen & Dainow

[57] ABSTRACT

Apparatus and method for forming curved needlepoint canvases from initially flat perforated sheet by applying pressure to a first side of the sheet, thus driving and deforming it into an aperture in a die, and by supporting the opposite side of the sheet during deformation with a pressure pad which includes a recess into which the deformed sheet is driven.

18 Claims, 9 Drawing Figures

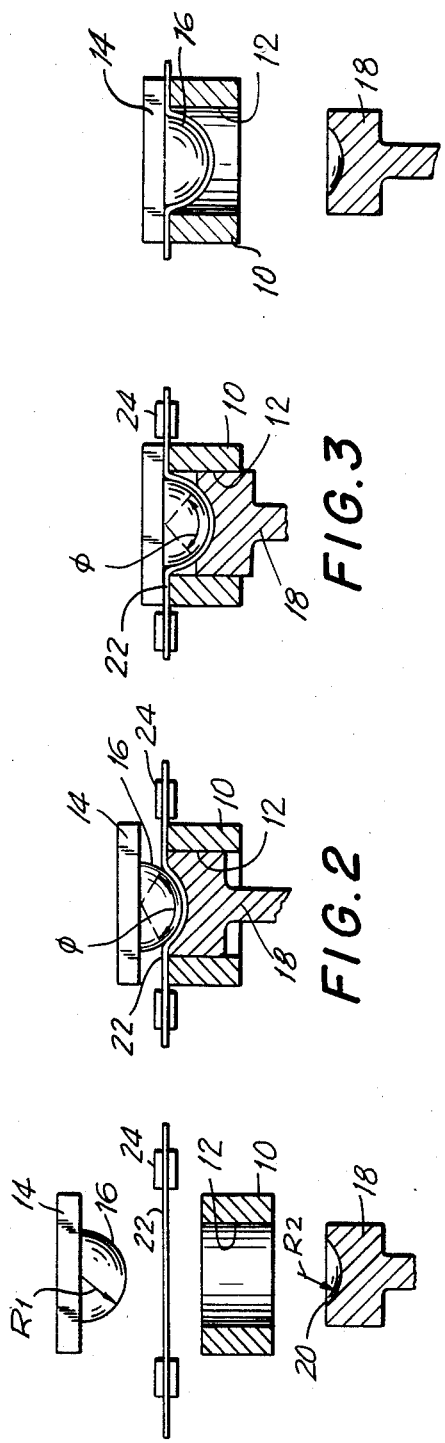
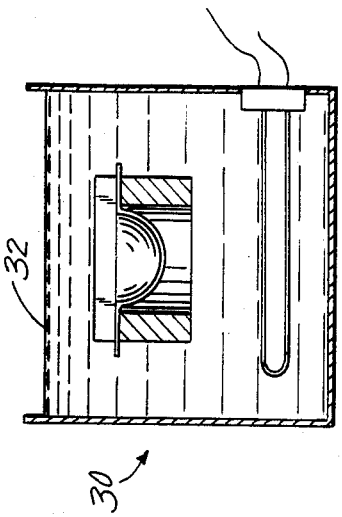

METHOD OF FORMING THERMOPLASTIC PERFORATED SHEET

BACKGROUND OF THE INVENTION

This invention is in the field of methods for forming and deep drawing thermoplastic sheet and particularly for forming perforated thermoplatic canvas as used in needlepoint work.

Popular needlepoint canvas is a mesh sheet of about 1/16 of an inch thick with a matrix of perpendicular threads defining therebetween a vast plurality of essentially square apertures. For many years these needlepoint canvases have been used in their original flat state, so that the resulting product is a stitched sheet which remains essentially flat like a placemat for a table or a wall-hanging.

To increase the possibilities for interesting and useful shapes of needlepoint canvas, attempts have been made to form the plastic canvases into different shapes, particularly curved shapes. These efforts have been less than satisfactory, and especially where deep drawing has been attempted the sheets have either ruptured in the area of the deep drawn curve or become too thin to use.

Various techniques have been attempted to overcome the problem of deep drawing thermoplastic materials, including roughening the end of a punching die or plunger so that the end part which contacts the sheet to be drawn engages said sheet with increased friction. This tends to protect the engaged part from excessive stretching and bending while inducing other parts of the sheet remote from the end of the punch die to stretch more uniformly. Other attempts to solve the problem include varying the temperature of the thermoplastic sheet, and particularly heating it to a softer state, however this usually led to greater rupturing rather than less.

The needlepoint canvases comprising essentially threads formed into a matrix comprise a fabric which is particularly fragile and susceptible of rupturing in the deep drawing processes regardless of techniques described above. The new invention seeks to provide a feasible economic process and apparatus for forming the peculiar thermoplastic mesh canvases as used in needlepoint into curved shapes, particularly a hemispherical curve or other deep drawn shapes. In seeking an economic technique, one object is to provide a process which can operate at room temperature and thus avoid heating costs. A further object is for the procedure to be very quick and simple and thus to be adaptable for mass production. These objectives have been achieved as described in the summary of the invention below and in the detailed description of the preferred embodiment thereafter.

SUMMARY OF THE INVENTION

This invention is a method and an apparatus for cold drawing a generally flat, perforated plastic sheet, particularly thermoplastic canvases as used in needlepoint. According to the invention a punch of a forming die having a curved contact surface is pressed against a first side of the plastic sheet. The opposite second side of the sheet is adjacent the aperture of a bore in a die ring, the sheet being pressed and deformed into the aperture by pressure of the contact surface of the punch or plunger as it is urged against the sheet. A first or holding means maintains the sheet generally flat against the die aperture while allowing movement of the sheet transversely of the axis of the bore. The punch preferably has a hemispherical shape and imparts that shape on the sheet during the forming process.

A particular feature of the invention is a pressure pad positioned on the side of the sheet opposite the punch, the pad having an end face in supporting engagement with the sheet and a recess in the end face conforming in shape generally to a central portion of the punch. When the punch is moved from a start position to a first position, it presses and deforms a central portion of the sheet into the recess and against a rear wall thereof, while other portions of the pad remain in stationary supporting engagement with the sheet.

At least on the surface of the punch that contacts the sheet during said first phase of deformation there is a layer of material having durometer less than that of the sheet. Accordingly, during said first phase when the sheet is pressed between the punch and the rear wall of the recess in the pad, the layer becomes embedded in the perforations in the sheet, whereby the sheet in the area of said engagement becomes mechanically coupled to the punch. This engagement remains during the second phase of deformation as the punch is pressed further against the sheet, and the pad remains against the sheet, but moves with it as the punch drives both.

After full deformation of the sheet, the pad is withdrawn, the punch, die and captured formed sheet therebetween are secured together and submerged in hot fluid, preferably boiling water for approximately 10–15 seconds. This permanently sets the shape of the formed canvas, which is cooled before the punch can be decoupled from the die.

The various features of the invention will be described in greater detail below with reference to the drawings appended hereto.

BRIEF DESCRIPTION OF THE DRAWINGS

FIG. 1 is a schematic elevation view of the die forming apparatus of the new invention shown poised before beginning the deep drawing operation;

FIG. 2 is a similar view showing the first stage of operation of the new apparatus with the canvas moved down to the die ring, the pressure pad moved upward to engage and support the canvas, and the upper form moved downward to partially deform the canvas while it is fully supported by the pressure pad;

FIG. 3 is a similar view showing the next stage of the operation where the upper form or punch has descended fully, thereby fully forming the canvas while forcing the pressure pad to descend further while it remains supporting the canvas;

FIG. 4 is a similar view showing the pressure pad withdrawn downward and away from the die ring and the canvas fully formed and remaining about the upper form;

FIG. 5 is a similar view of the apparatus of FIG. 4 which has been placed in a tank of boiling water;

DETAILED DESCRIPTION OF THE PREFERRED EMBODIMENT

Figure 9:
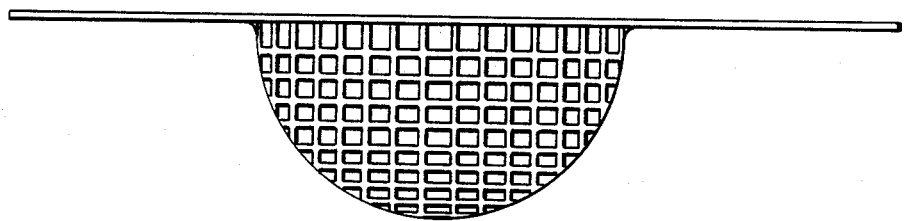
FIG. 9 is an elevation view of a fully formed canvas.
Figure 8:
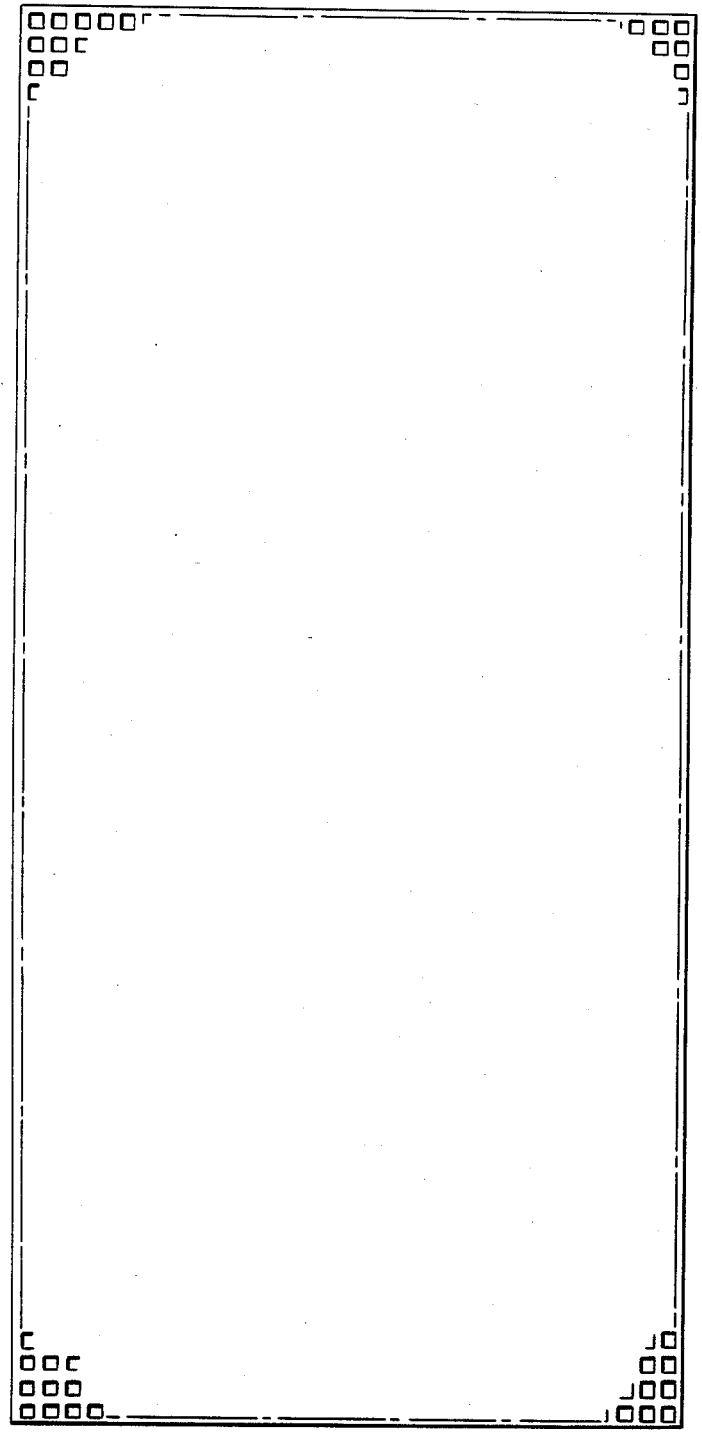
FIG. 8 is a plan view of a flat canvas fabric.

FIG. 1 shows the general arrangement of the apparatus of the new invention including the die ring 10 which has a round cylindrical bore 12, an upper die, form or punch 14 which has a hemispherical contact surface 16, and a supporting pressure pad 18 having a partial hemispherical curved cavity 20 in its top surface. The flat needlepoint canvas to be formed is indicated by line 22 which is supported in a canvas holder 24. The final shape of the canvas after forming pursuant to this invention is shown in FIG. 9. The general operation of mating dies for deep drawing is well known in the prior art and accordingly it is assumed that anyone skilled in this art will readily understand how to assemble a punch and die and how to cause parts to move with hydraulic or other power.

Figure 6:
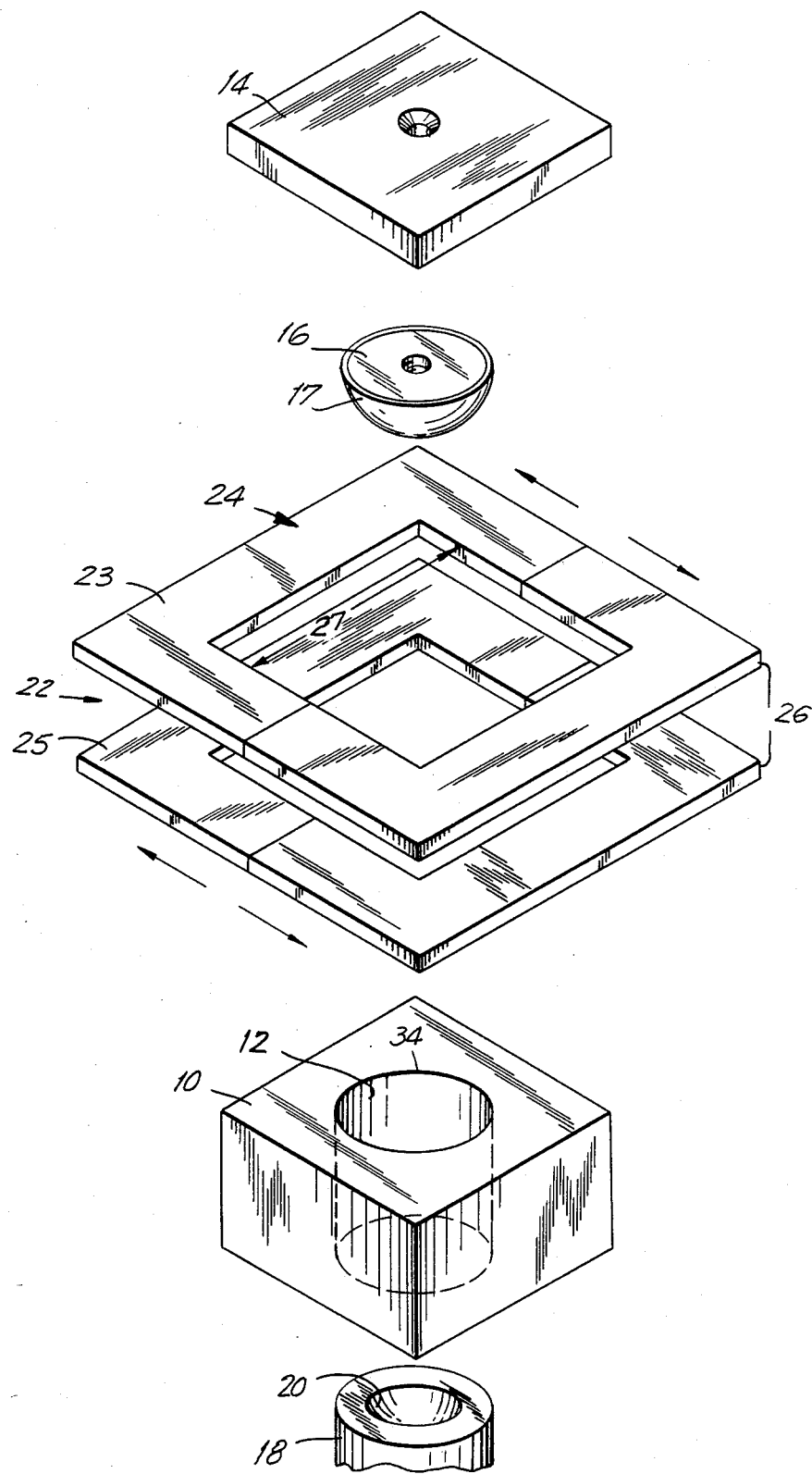
FIG. 6 is an exploded and enlarged view in perspective showing the components of the forming apparatus of FIG. 1.
Figure 7:
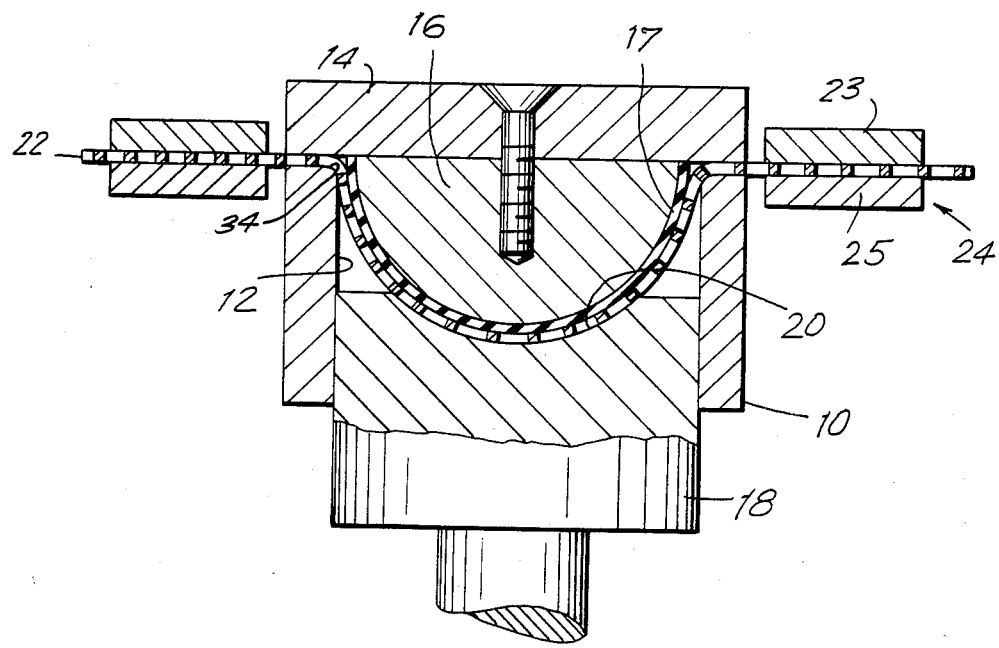
FIG. 7 is an enlarged view showing details of the apparatus which correspond to FIG. 3 above.

FIGS. 1-4 should be considered with FIG. 6 which shows an enlarged view of the apparatus for greater clarity. The canvas holder 24 is shown as an upper square frame 23 and a similar lower square frame 25 which are securable together by connection means 26 in such a way that canvas 22 can be loosely held and guided between the two frames. When these frames are closed they will hold the canvas generally flat and prevent same from curling and folding, but they will allow clearance between them sufficient for the canvas to shift and slide during the forming process.

When the process begins the canvas holder with the canvas secured therein is moved to a position atop the top edge of the forming die or die ring 10 as shown in FIG. 2. The pressure pad 18 has cavity 20 dimensioned to have radius greater than that of the hemispherical curve 16 by an amount approximately equal to the thickness of the canvas 22, namely approximately 1/6 of an inch. For convenience we will designate R1 as the radius of the upper hemispherical form and R2 as the radius of the lower form cavity 20, where R2=R1+thickness of canvas.

As indicated in FIG. 2 the first forming phase or stage is carried out by moving the form 16 down into the canvas and deforming said canvas into the cavity 20 of the pressure pad. This deformation will be approximately 30 to 40 percent of the magnitude of radius R1 or the vertical travel of form 16 during forming. The final deformation of the canvas to its full hemispherical shape will constitute the remaining 60 to 70 percent of the movement of the upper die relative to the canvas as evidenced in the change from FIG. 2 to FIG. 3, which also drives the pressure pad downward similarly.

As indicated above the canvas is made of thermoplastic material such as polyethylene. A feature of the new invention is the relatively soft layer 17 of polyurethane which is clad in hemispherical shape about the upper form 16. This layer, having durometer in the range of 20 to 30, is soft relative to the durometer of the canvas fabric. In phase or stage 2 when the upper form 16 first engages and begins to press against the canvas, the polyurethane layer being relatively softer than the canvas, will deform into the canvas aperatures and embed itself therein leading to a relatively solid mechanical engagement over the entire area of contact indicated by angle $\phi$ in FIG. 2. This action causes the canvas to become secured to the upper form while it is simultaneously supported by the pressure pad 18 in that area of contact, which engagement and support remain during the next deep drawing phase represented in FIG. 3. As a result of this $\phi$ area being engaged tightly by the upper form and supported, it is prevented from further excessive stretching or fracturing, so that as the remainder of the deep drawing process occurs, the base areas of the hemisphere or dome are stretched more and due to their location and configuration and the dynamics of the deep drawing process, rupturing or excessive thinning of the canvas at its central or other areas is avoided. At the conclusion of step 3 the canvas is fully formed, and by step 4 the pressure pad is withdrawn downward to leave the formed canvas clinging about the upper form 16. The canvas holder 24 is removed and the subassembly of die 10, upper form 14 and formed canvas 22 are placed into a tank 30 of boiling water 32 as indicated in FIG. 5. Submersion in water of boiling temperature for approximately 10–15 seconds is generally sufficient time for the formed canvas to heatup to the same temperature of boiling water. Once it reaches this temperature it can then be placed in a tank of cold water for 10–15 seconds, and then the formed canvas can be removed from the forming tool 10 and 14 to be trimmed. As seen in FIGS. 2 and 6, the breadth 27 of the opening in the canvas is greater than the outer diameter of die 10 so that the canvas can lie flush atop the die with interference from the holder.

To enhance the efficiency of the forming process a radius 34 is formed on the top edge of the bore 12 in die ring 10 as indicated in FIG. 6. In the preferred embodiment the dimension of the upper formed hemisphere is $2\frac{5}{8}$ inches.

Between steps 4 and 5, before the subassembly is dropped into boiling water the upper die 14 must be clamped to the lower die ring 10 about the marginal area of the canvas to assure the canvas remains stretched tightly about form 16 when it enters the boiling water. After the cooling phase the clamp is removed, the subassembly broken apart and the canvas is complete.

Numerous variations in structure and method are possible for carrying out this invention while remaining within the concept and spirit of the invention as defined in the following claims.

What is claimed is:
1. In an apparatus for cold drawing a generally flat perforated plastic sheet, the apparatus including
   a die having a bore therein terminating in an aperture,
   first means for holding said sheet adjacent said aperture, and
   a punch having a curved contact surface, said punch being movable from a start position spaced from said sheet to a first position pressing a portion of said sheet into said aperture and forming a depression in said sheet,
   the improvement in combination therewith comprising:
   a pressure pad having an end surface with a recess in the center thereof, said pad having a first position inside said bore with said end surface adjacent said aperture and engaging and supporting said sheet while said punch is pressed downward, deforming said sheet into said recess
   said punch and pad being further movable to a second position, said punch pressing said sheet and pad together further into said bore and further deforming said sheet to have the shape of said contact surface while said pad remains engaging and supporting said deformed portion of said sheet, and drive means for moving said punch between said start, first and second positions, said punch further comprising on said contact surface a layer of material having durometer less than that of said sheet, said layer becoming embedded in perforations in said sheet when the punch is pressed to said first position, thereby establishing a mechanical coupling of said punch and sheet in the area of said embedded engagement.

2. Apparatus according to claim 1 wherein said contact surface comprises a hemispherical shape and said pad recess defines a circular arc having nominally the same radius as said hemispherical shape.

3. Apparatus according to claim 2 wherein said recess in said pressure pad had depth below said end surface of said pressure pad less than 50% of the radius of said contact surface, and said punch descends to said first position and forms said sheet fully into said recess while said pad is stationary and supports said sheet by engagement of said annular end surface, and said punch subsequently descends the remainder of the depth to said second position further drawing said sheet and simultaneously driving said pad downward the same distance as said punch moves between said first and second position.

4. Apparatus according to claim 2 wherein said punch further comprises a hemispherical-shaped layer of material having durometer less than that of said sheet secured on said hemispherical contact surface, said layer becoming embedded into perforations of said sheet when the punch is pressed to said first position, thereby establishing a mechanical coupling of said punch and sheet in the area of said embedded engagement.

5. Apparatus according to claim 4 wherein said layer is polyurethane having durometer in the range of 20 to 30.

6. Apparatus according to claim 2 wherein said die has a vertical bore defining a right cylinder whose diameter is the same as said aperture in the top end of said die, and said hemispherical contact surface of the punch has a radius nominally the same as said aperture.

7. Apparatus according to claim 1 wherein said first means is a frame comprising top and bottom parts separated by a space, said sheet being maintainable in a generally flat state in said space and being laterally movable in said space relative to said frame during said forming of said sheet.

8. Apparatus according to claim 7 wherein said top and bottom frames comprise generally square plates, each having a square central aperture the breadth of which is greater than the breadth of said die.

9. Apparatus according to claim 1 further comprising second means for releasably securing said punch to said die with said formed sheet therebetween.

10. Apparatus according to claim 1 wherein said die, punch, and pad comprise metal that is generally rigid.

11. Apparatus according to claim 1 wherein said pad is movable further downward to a third position separating said pad from said engagement with said sheet which remains between said punch and die, said drive means driving said pad to said third position after said punch and pad are driven to said second position.

12. Apparatus according to claim 11 further comprising means for coupling together said punch, die and formed sheet therebetween and means for heating said coupled punch, die and formed sheet to a temperature of approximately 212° F. for at least five seconds and then separating said punch, die and formed sheet.

13. Apparatus according to claim 1 wherein said sheet comprises thermoplastic.

14. Apparatus according to claim 1 wherein said sheet comprises thermoplastic formed as a mesh of two sets of parallel spaced ribs, one set perpendicular to the other with generally square shaped apertures between said ribs.

15. In a method of cold drawing a generally flat plastic sheet in which there are a plurality of spaced perforations, including the steps of positioning a punch with its contact surface on a first side of said sheet and an aperture of a die on the second opposite side of said sheet and pressing and deforming said sheet by said punch into said aperture, the improvement comprising the further steps of securing on said punch a layer of material having softer durometer than that of said sheet, supporting said second side of said sheet by an end surface of a pressure pad having a recess in said end surface, said recess having an inner wall conforming in shape to a contact surface of said punch, while urging said punch to press and deform a portion of said sheet into the recess and against said inner wall, thereby embedding said layer into perforations in said sheet when said sheet is pressed into said aperture and into and against said recess wall of said pad, thereby establishing a mechanical coupling between said punch and said sheet in the area of said embedded engagement, and thereafter urging said punch to press against and further deform said sheet while said inner wall remains in supporting engagement with said second side of said sheet and is moved as said punch further deforms said sheet.

16. A method according to claim 15 comprising the further step of separating said pad from said formed sheet, securing together said punch, die and formed sheet therebetween as a subassembly, submerging said subassembly in liquid at a temperature of approximately 212° F. for at least five seconds, removing said subassembly from said liquid and separating said formed sheet from said punch and die.

17. A method according to claim 15 wherein said liquid is water.

18. A method according to claim 15 wherein said punch defines a hemispherical shape, said recess in said pad defines a circular depression having radius slightly greater than the radius of said hemisphere, and said aperture has radius nominally the same as said hemisphere.

* * * * *